US012618335B2

(12) United States Patent
Hiett et al.

(10) Patent No.: US 12,618,335 B2
(45) Date of Patent: May 5, 2026

(54) IN-FLIGHT HYBRID ELECTRIC ENGINE SHUTDOWN

(71) Applicant: General Electric Company, Schenectady, NY (US)

(72) Inventors: David Alexander Hiett, Cincinnati, OH (US); Stefan Joseph Cafaro, Chapel Hill, NC (US); David Marion Ostdiek, Liberty Township, OH (US); Robert Jon McQuiston, Cincinnati, OH (US); Paul Robert Gemin, Cincinnati, OH (US); Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/168,725

(22) Filed: Feb. 5, 2021

(65) Prior Publication Data

US 2022/0063826 A1     Mar. 3, 2022

Related U.S. Application Data

(60) Provisional application No. 63/072,573, filed on Aug. 31, 2020.

(51) Int. Cl.
B64D 31/18          (2024.01)
F01D 21/00          (2006.01)
(Continued)

(52) U.S. Cl.
CPC ............. F01D 21/00 (2013.01); B64D 31/18 (2024.01); F02C 7/262 (2013.01); F02C 9/00 (2013.01); B64D 27/33 (2024.01)

(58) Field of Classification Search
CPC .......................... B64D 2027/026; B64D 27/24
See application file for complete search history.

(56) References Cited

U.S. PATENT DOCUMENTS

| | | | |
|---|---|---|---|
| 3,421,317 A | 1/1969 | Bedford | |
| 3,657,881 A * | 4/1972 | Amann | F02C 9/56 |
| | | | 477/30 |

(Continued)

FOREIGN PATENT DOCUMENTS

| | | |
|---|---|---|
| CN | 101737171 A | 6/2010 |
| CN | 104632416 A | 5/2015 |

(Continued)

OTHER PUBLICATIONS

Budharaju Balaji, N Om Prakash Raj, Mahesh p. Padwale, G P Ravishankar, "Modelling, Analysis and Flight Testing of a Military Turbofan Engine Under Windmilling Conditions", Dec. 5-6, 2019, ASME, GTINDIA2019-2353, pp. 1-5. (Year: 2019).*

(Continued)

*Primary Examiner* — Devon C Kramer
*Assistant Examiner* — Marc Amar
(74) *Attorney, Agent, or Firm* — Dority & Manning, P.A.

(57)          ABSTRACT
A method for operating a hybrid-electric propulsion system of an aircraft is provided. The hybrid-electric propulsion system includes a gas turbine engine having a high pressure system, a low pressure system, and an electric machine coupled to one of the high pressure system or low pressure system. The method includes receiving data indicative of an actual or anticipated in-flight shutdown of the gas turbine engine; and adding power to the gas turbine engine through the electric machine in response to receiving data indicative of the actual or anticipated in-flight shutdown of the gas turbine engine.

15 Claims, 10 Drawing Sheets

(51) Int. Cl.
    *F02C 7/262*      (2006.01)
    *F02C 9/00*       (2006.01)
    *B64D 27/33*     (2024.01)

(56)         References Cited

U.S. PATENT DOCUMENTS

| | | | |
|---|---|---|---|
| 3,750,782 A * | 8/1973 | Costantini | F16D 41/066 |
| | | | 192/45.02 |
| 5,442,907 A * | 8/1995 | Asquith | H05H 1/46 |
| | | | 60/39.821 |
| 5,915,917 A | 6/1999 | Eveker et al. | |
| 6,010,303 A | 1/2000 | Feulner | |
| 6,059,522 A | 5/2000 | Gertz et al. | |
| 6,979,979 B2 | 12/2005 | Xu et al. | |
| 7,827,803 B1 | 11/2010 | Wadia et al. | |
| 8,866,318 B2 | 10/2014 | Langford et al. | |
| 9,267,438 B2 | 2/2016 | Dooley et al. | |
| 9,428,267 B2 | 8/2016 | DeVita et al. | |
| 9,441,547 B2 | 9/2016 | Cai et al. | |
| 9,561,860 B2 | 2/2017 | Knapp et al. | |
| 9,630,510 B2 | 4/2017 | Sukumaran et al. | |
| 9,643,729 B2 | 5/2017 | Walter-Robinson | |
| 9,828,917 B2 | 11/2017 | Klonowski et al. | |
| 9,889,746 B2 | 2/2018 | Wolff et al. | |
| 10,023,319 B2 | 7/2018 | Teicholz et al. | |
| 10,260,471 B2 | 4/2019 | Huang | |
| 10,308,353 B2 | 6/2019 | Swann | |
| 10,336,461 B2 | 7/2019 | Mackin | |
| 10,392,119 B2 | 8/2019 | Niergarth et al. | |
| 10,435,165 B2 | 10/2019 | Swann et al. | |
| 10,436,059 B2 | 10/2019 | Liu et al. | |
| 10,442,547 B2 | 10/2019 | Miller et al. | |
| 10,450,886 B2 | 10/2019 | Sennoun | |
| 10,487,733 B2 | 11/2019 | Morgan | |
| 10,494,095 B2 | 12/2019 | Groninga et al. | |
| 10,569,759 B2 | 2/2020 | Gansler et al. | |
| 10,644,630 B2 | 5/2020 | Smith et al. | |
| 10,676,199 B2 | 6/2020 | Hon et al. | |
| 10,696,416 B2 | 6/2020 | Gansler et al. | |
| 10,711,693 B2 | 7/2020 | Miller et al. | |
| 10,724,442 B2 | 7/2020 | Betti et al. | |
| 10,737,798 B2 | 8/2020 | Misfeldt | |
| 10,738,706 B2 | 8/2020 | Gansler et al. | |
| 10,800,536 B2 | 10/2020 | Wagner et al. | |
| 10,859,002 B2 | 12/2020 | Kim | |
| 10,953,995 B2 | 3/2021 | Gansler et al. | |
| 11,007,955 B2 | 5/2021 | Klemen et al. | |
| 11,149,648 B2 | 10/2021 | Husband et al. | |
| 11,448,138 B2 | 9/2022 | Romero et al. | |
| 11,873,110 B2 | 1/2024 | Hon et al. | |
| 2003/0115883 A1 * | 6/2003 | Myers, Jr. | F02C 9/28 |
| | | | 60/773 |
| 2004/0216457 A1 | 11/2004 | Shea et al. | |
| 2005/0225303 A1 | 10/2005 | Xu et al. | |
| 2009/0145998 A1 | 6/2009 | Salyer | |
| 2010/0138089 A1 | 6/2010 | James | |
| 2011/0146290 A1 * | 6/2011 | Vernet | F01D 19/00 |
| | | | 60/778 |
| 2011/0259016 A1 * | 10/2011 | Winston | F02C 7/26 |
| | | | 60/778 |
| 2012/0167590 A1 | 7/2012 | Bettner | |
| 2013/0086919 A1 | 4/2013 | Dooley et al. | |
| 2013/0097992 A1 * | 4/2013 | Suciu | B64D 13/06 |
| | | | 60/39.83 |
| 2013/0247579 A1 | 9/2013 | Morawski et al. | |
| 2014/0093350 A1 | 4/2014 | Meisner et al. | |
| 2015/0044020 A1 | 2/2015 | Grewe | |
| 2015/0183387 A1 | 7/2015 | Lepage et al. | |
| 2015/0321752 A1 | 11/2015 | Trull et al. | |
| 2016/0053721 A1 | 2/2016 | Fletcher et al. | |
| 2016/0325826 A1 | 11/2016 | Swann | |
| 2017/0044989 A1 | 2/2017 | Gemin et al. | |
| 2017/0057650 A1 | 3/2017 | Walter-Robinson | |
| 2017/0175565 A1 | 6/2017 | Sennoun | |
| 2017/0175646 A1 | 6/2017 | Adibhatla | |
| 2017/0218854 A1 | 8/2017 | Nestico et al. | |
| 2017/0226933 A1 | 8/2017 | Klonowski et al. | |
| 2017/0226934 A1 | 8/2017 | Robic et al. | |
| 2017/0248080 A1 | 8/2017 | Chevalier et al. | |
| 2017/0268430 A1 | 9/2017 | Schwarz | |
| 2017/0320584 A1 | 11/2017 | Menheere | |
| 2017/0320854 A1 | 11/2017 | Collin et al. | |
| 2017/0342855 A1 * | 11/2017 | Hon | F01D 19/02 |
| 2018/0002025 A1 | 1/2018 | Lents et al. | |
| 2018/0030904 A1 | 2/2018 | Meunier | |
| 2018/0050807 A1 * | 2/2018 | Kupiszewski | B64D 27/24 |
| 2018/0065755 A1 | 3/2018 | Teicholz et al. | |
| 2018/0073437 A1 * | 3/2018 | Simonetti | F02C 7/26 |
| 2018/0128182 A1 * | 5/2018 | Hayama | F02C 7/262 |
| 2018/0134407 A1 | 5/2018 | Elbibary et al. | |
| 2018/0141674 A1 | 5/2018 | Bailey et al. | |
| 2018/0187604 A1 | 7/2018 | Poumarede et al. | |
| 2018/0194483 A1 | 7/2018 | Schwoller | |
| 2018/0319283 A1 | 11/2018 | Battin et al. | |
| 2018/0354631 A1 | 12/2018 | Adibhatla et al. | |
| 2018/0354632 A1 * | 12/2018 | Hon | F01D 15/10 |
| 2018/0354635 A1 * | 12/2018 | Wagner | B64C 27/12 |
| 2018/0370646 A1 | 12/2018 | Hon et al. | |
| 2018/0372588 A1 | 12/2018 | Hon et al. | |
| 2019/0003398 A1 | 1/2019 | Gibson et al. | |
| 2019/0136768 A1 | 5/2019 | Harvey | |
| 2019/0165708 A1 | 5/2019 | Smith et al. | |
| 2019/0186284 A1 | 6/2019 | Orkiszewski | |
| 2019/0323426 A1 * | 10/2019 | Mackin | B64D 27/10 |
| 2019/0345837 A1 | 11/2019 | Bacic | |
| 2019/0368500 A1 | 12/2019 | Epstein | |
| 2019/0375512 A1 | 12/2019 | Ribeiro et al. | |
| 2020/0010205 A1 | 1/2020 | Swann et al. | |
| 2020/0056546 A1 | 2/2020 | Terwilliger et al. | |
| 2020/0056551 A1 | 2/2020 | Epstein | |
| 2020/0079513 A1 | 3/2020 | Pastouchenko et al. | |
| 2020/0095939 A1 | 3/2020 | Epstein | |
| 2020/0182158 A1 | 6/2020 | Kupratis | |
| 2020/0248619 A1 | 8/2020 | Romero et al. | |
| 2020/0284265 A1 | 9/2020 | Reepmeyer et al. | |
| 2021/0025339 A1 * | 1/2021 | Terwilliger | F01D 19/00 |
| 2021/0108569 A1 | 4/2021 | Devendorf | |

FOREIGN PATENT DOCUMENTS

| | | |
|---|---|---|
| CN | 105822434 A | 8/2016 |
| CN | 103835881 B | 9/2016 |
| EP | 2042743 A1 | 4/2009 |
| GB | 887679 A | 1/1962 |
| GB | 1372353 A | 10/1974 |
| JP | 5923515 B2 | 5/2016 |
| RU | 2322601 C1 | 4/2008 |
| WO | WO2008/049426 A1 | 5/2008 |
| WO | WO2008/085535 A2 | 7/2008 |
| WO | WO2014/085236 A1 | 7/2008 |
| WO | WO2015/92269 A1 | 6/2015 |

OTHER PUBLICATIONS

Weigl et al., "Active Stabilization of Rotating Stall and Surge in a Transonic Single Stage", Massachusetts Institute of Technology, Jul. 1997, 303 Pages.

* cited by examiner

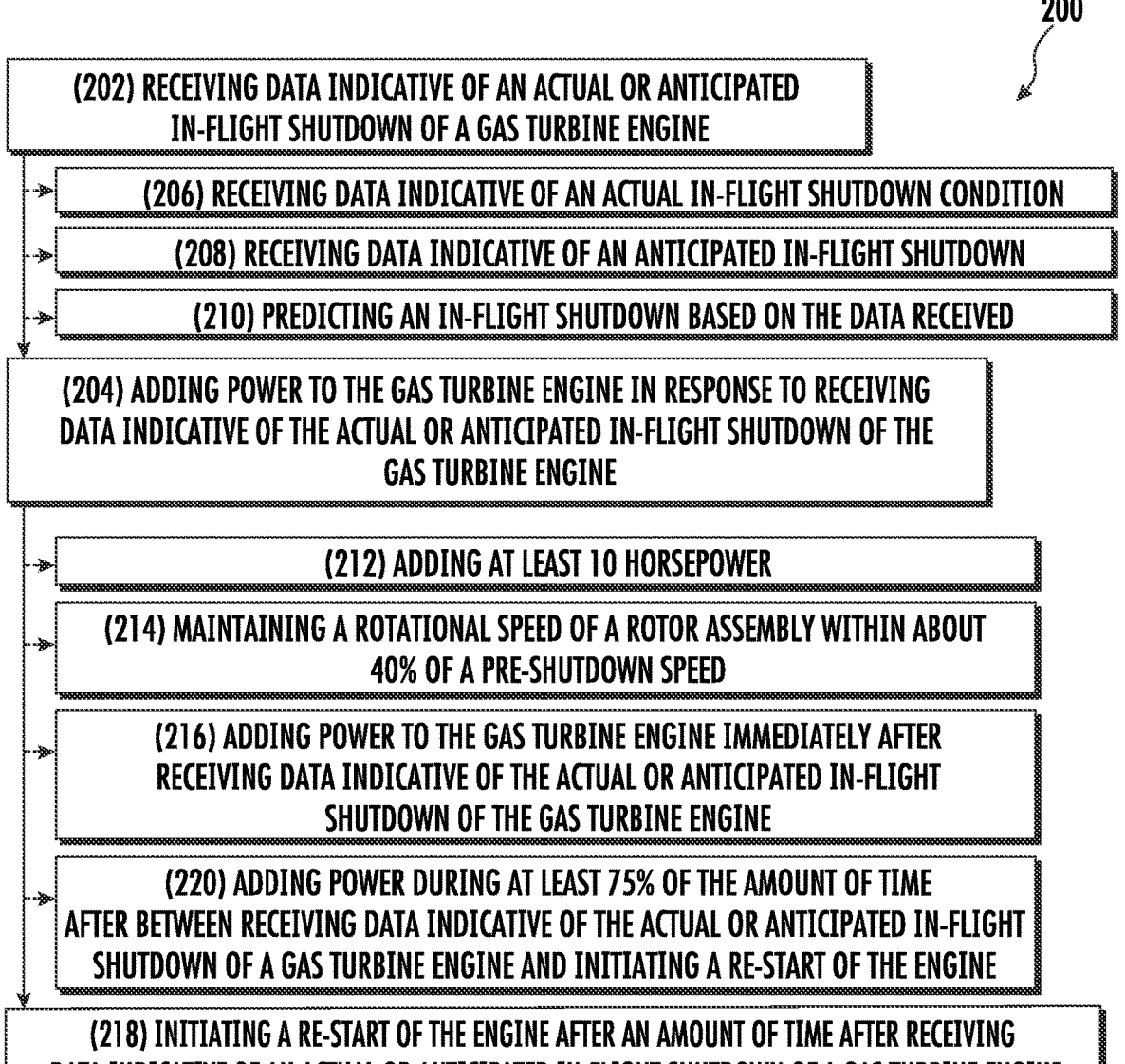

200

(202) RECEIVING DATA INDICATIVE OF AN ACTUAL OR ANTICIPATED IN-FLIGHT SHUTDOWN OF A GAS TURBINE ENGINE (206) RECEIVING DATA INDICATIVE OF AN ACTUAL IN-FLIGHT SHUTDOWN CONDITION (208) RECEIVING DATA INDICATIVE OF AN ANTICIPATED IN-FLIGHT SHUTDOWN (210) PREDICTING AN IN-FLIGHT SHUTDOWN BASED ON THE DATA RECEIVED (204) ADDING POWER TO THE GAS TURBINE ENGINE IN RESPONSE TO RECEIVING DATA INDICATIVE OF THE ACTUAL OR ANTICIPATED IN-FLIGHT SHUTDOWN OF THE GAS TURBINE ENGINE (212) ADDING AT LEAST 10 HORSEPOWER (214) MAINTAINING A ROTATIONAL SPEED OF A ROTOR ASSEMBLY WITHIN ABOUT 40% OF A PRE-SHUTDOWN SPEED (216) ADDING POWER TO THE GAS TURBINE ENGINE IMMEDIATELY AFTER RECEIVING DATA INDICATIVE OF THE ACTUAL OR ANTICIPATED IN-FLIGHT SHUTDOWN OF THE GAS TURBINE ENGINE (220) ADDING POWER DURING AT LEAST 75% OF THE AMOUNT OF TIME AFTER BETWEEN RECEIVING DATA INDICATIVE OF THE ACTUAL OR ANTICIPATED IN-FLIGHT SHUTDOWN OF A GAS TURBINE ENGINE AND INITIATING A RE-START OF THE ENGINE (218) INITIATING A RE-START OF THE ENGINE AFTER AN AMOUNT OF TIME AFTER RECEIVING DATA INDICATIVE OF AN ACTUAL OR ANTICIPATED IN-FLIGHT SHUTDOWN OF A GAS TURBINE ENGINE

FIG. 4

IN-FLIGHT HYBRID ELECTRIC ENGINE SHUTDOWN

CROSS-REFERENCE TO RELATED APPLICATION

This application is a non-provisional application claiming the benefit of priority under 35 U.S.C. § 119(e) to U.S. Provisional Application No. 63/072,573, filed Aug. 31, 2020, which is hereby incorporated by reference in its entirety.

FIELD

The present subject matter relates generally to a hybrid-electric aircraft propulsion system, and more particularly to in-flight engine shutdown operations for a hybrid electric engine.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Hybrid electric propulsion systems are being developed to improve an efficiency of the conventional commercial aircraft. Various hybrid electric propulsion systems include an electric machine driven by one of the aircraft engines. The inventors of the present disclosure have come up with various configurations and/or methods to improve the currently-known hybrid electric propulsion systems.

BRIEF DESCRIPTION

Aspects and advantages of the invention will be set forth in part in the following description, or may be obvious from the description, or may be learned through practice of the invention.

In one exemplary aspect of the present disclosure, a method for operating a hybrid-electric propulsion system of an aircraft is provided. The hybrid-electric propulsion system includes a gas turbine engine having a high pressure system, a low pressure system, and an electric machine coupled to one of the high pressure system or low pressure system. The method includes receiving data indicative of an actual or anticipated in-flight shutdown of the gas turbine engine; and adding power to the gas turbine engine through the electric machine in response to receiving data indicative of the actual or anticipated in-flight shutdown of the gas turbine engine.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a flow diagram of a method for operating a gas turbine engine in accordance with an exemplary aspect of the present disclosure.

DETAILED DESCRIPTION

Figure 1:
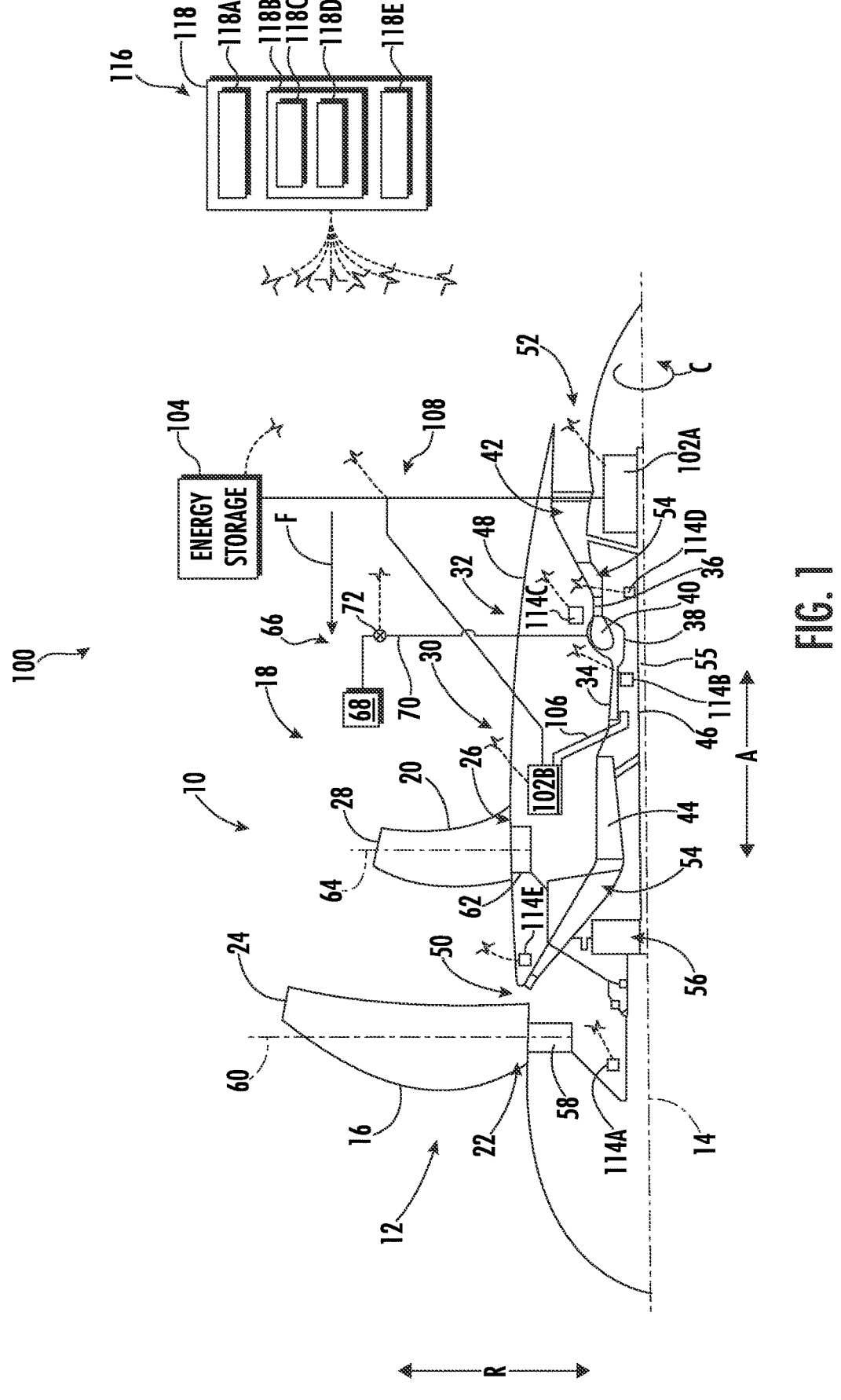
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Initially, the one or more gas turbine engines of a propulsion system of an aircraft must be started. Additionally, it may be necessary to start, or more particularly to re-start, one or more of the gas turbine engines during a flight in the event of an unscheduled shutdown of the gas turbine engines. For example, the gas turbine engine may shut down due to ice ingestions, bird strikes, inadvertent engine shutdown commanded by the flight crew, etc.

During an initial start, a starter system, such as a pneumatic starter, rotates the gas turbine to a speed sufficient to initiate an ignition of a combustion section of the gas turbine. With regard to mid-flight starts, there is usually an amount of time between the shutdown and the restart of the propulsion system. During this time, the rotating components of the engine slow significantly (sometimes referred to as speed decay). During at least some of these operations, the relighting may occur without use of the starter system, such that when the process of restarting the engine begins, the relighting may need to occur at relatively low rotational speeds (e.g., at windmilling speeds as from a design standpoint it must be assumed that the starter system in not available). When this is the case, the engine must be designed to be capable of successfully executing the relight at the relatively low speeds, which results in oversizing of certain components, such as certain fuel flow components.

Accordingly, the inventors of the present disclosure have conceived of a system and method of reducing the amount of speed decay during an inflight shutdown, such that an in-flight relight may occur at higher rotational speeds. In general, the system and method utilizes a hybrid electric propulsion system, and in particular utilizes an engine including an electric machine coupled to a low pressure system of the engine, an electric machine coupled to a high pressure system of the engine, or both. As may be appreciated, and as will be discussed in more detail below, the electric machine(s) may be capable of operating at the high rotational speeds of the engine immediately following the in-flight shutdown, such that they may substantially immediately apply torque to the engine and substantially immediately reduce the amount of speed decay during the inflight shutdown procedure.

Referring now to FIG. 1, a cross-sectional view of an exemplary embodiment of a gas turbine engine as may incorporate one or more inventive aspects of the present disclosure is provided. In particular, the exemplary gas turbine engine of FIG. 1 is a configured as a single unducted rotor engine 10 defining an axial direction A, a radial direction R, and a circumferential direction C. As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10.

Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14.

The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having a core (or high pressure/high speed system) 32 and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool 55 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As is depicted, the rotor assembly 12 is driven by the turbomachine 30, and more specifically, is driven by the low speed spool 55. More specifically, still, engine 10 in the embodiment shown in FIG. 1 includes a power gearbox 56, and the rotor assembly 12 is driven by the low speed spool 55 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F. For example, in certain embodiments, one or more engines configured in a manner similar to the exemplary engine 10 depicted in FIG. 1 may be incorporated in and utilized with the aircraft of FIGS. 1, 4, and/or 5.

The power gearbox 56 may include a gearset for decreasing a rotational speed of the low speed spool 55 relative to the low speed turbine 42, such that the rotor assembly 12 may rotate at a slower rotational speed than the low speed spool 55.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; fixed-pitch blades 16, 20, or both; a direct-drive configuration (i.e., may not include the gearbox 56); etc. For example, in other exemplary embodiments, the engine 10 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Figure 2:
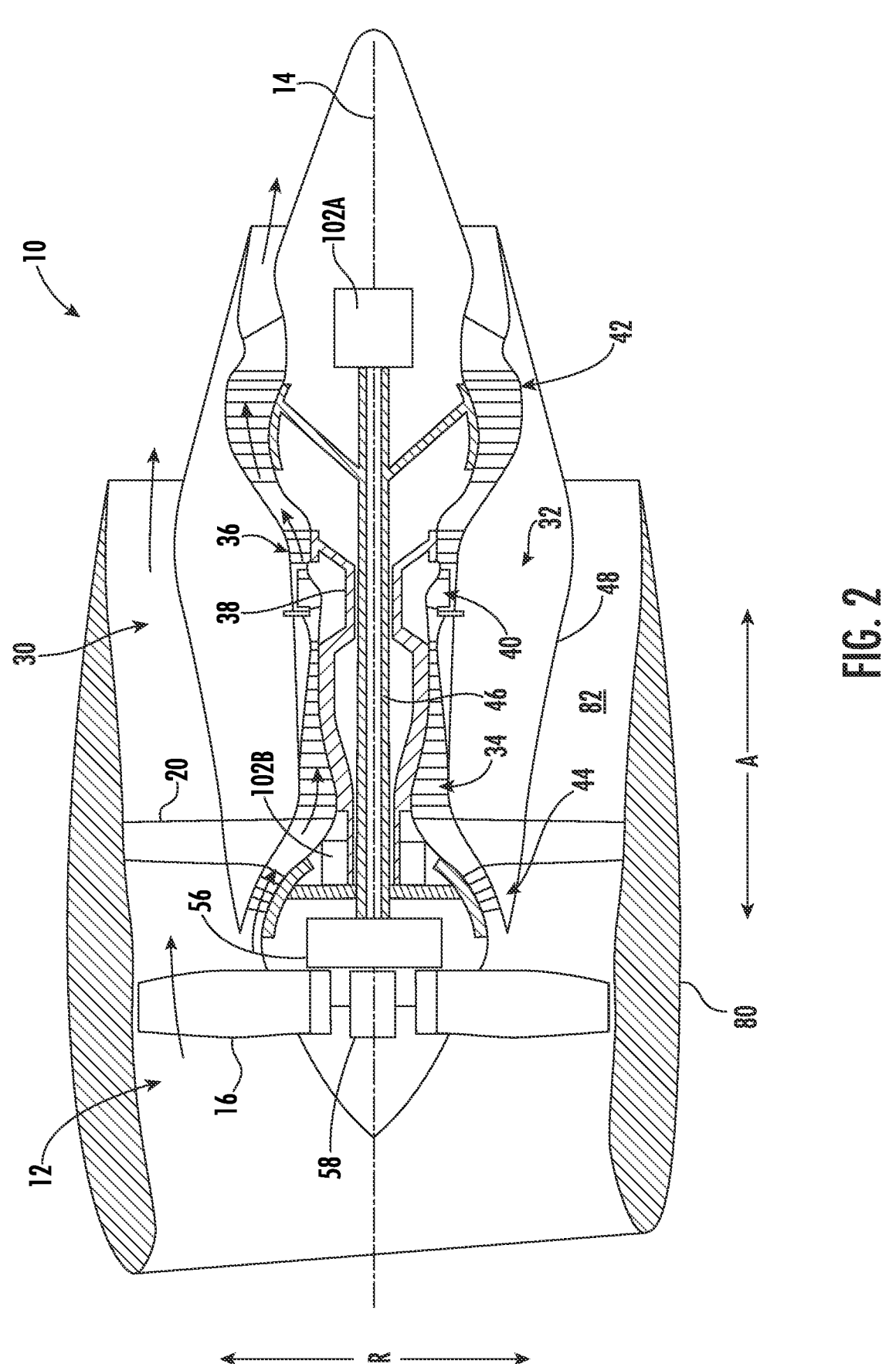
FIG. 2 is a schematic, cross-sectional view of a gas turbine engine in accordance with another exemplary embodiment of the present disclosure.

Further, still, in other exemplary embodiments, the engine 10 may be configured as a ducted turbofan engine. For example, referring briefly to FIG. 2, an engine 10 in accordance with another exemplary embodiment of the present disclosure is depicted. The exemplary embodiment of FIG. 2 may be configured in substantially the same manner as the exemplary engine 10 described above with respect to FIG. 1, and the same or similar reference numerals may refer to the same or similar parts. However, as will be appreciated, for the embodiment shown, the engine 10 further includes a nacelle 80 circumferentially surrounding at least in part the rotor assembly 12 and turbomachine 30, defining a bypass passage 82 therebetween.

Referring now back to FIG. 1, it will be appreciated that for the embodiment shown, the exemplary hybrid electric propulsion system further includes a fuel delivery system 66. The fuel delivery system 66 generally includes a fuel source 68 (which may be, e.g., a fuel tank of an aircraft including the engine 10), one or more fuel lines 70 extending between the fuel source 68 and the combustion section 40 of the engine 10, and a fuel valve 72. The fuel valve 72 is in fluid communication with the one or more fuel lines 70, configured to regulate a fuel flow through the one or more fuel lines 70 from the fuel source 68 to the combustion section 40. The fuel valve 72 may be referred to as, or configured as part of, a fuel metering unit ("FMU"), and may generally control a power output of the engine 10.

Moreover, it will further be appreciated that the engine is integrated with an electric power system 100. The electric power system 100 generally includes an electric machine 102 coupled to at least one of the high pressure system (or core 32) or the low pressure system, and an energy storage unit 104

Further, for the embodiment shown, the electric power system 100 includes an electric power bus 108 electrically connecting the various components of electric power system 100. The electric power bus 108 may be, e.g., one or more electrical lines arranged in any suitable configuration.

Referring still to the exemplary embodiment of FIG. 1, although not depicted, it will be appreciated that the exemplary electric power system may also include an auxiliary power unit. The auxiliary power unit, if included, may include a combustion engine driving an electric generator, and may be located remotely from the engine 10. For example, in at least certain exemplary embodiments, the auxiliary power unit, if provided, may be located within a fuselage of the aircraft utilizing the engine 10, e.g., at an aft end of the aircraft, and electrically coupled to the electric power bus 108.

Further, still, for the embodiment shown, the electric machine 102 of the electric power system 100 is an LP electric machine 102A coupled to the low pressure system of the engine. More specifically, for the embodiment shown, the LP electric machine 102A is embedded within the engine 10, at a location within or aft of the turbine section of the engine 10, and inward of the core airflow path 54 through the engine 10 along the radial direction R. It will be appreciated, however, that in other example embodiments, the LP electric machine 102A may additionally, or alternatively, be configured in the other suitable manner. For example, in other embodiments, the LP electric machine 102A may be embedded within a compressor section of the engine 10, may be located outward of core airflow path 54 along the radial direction R (and, e.g., within the cowl 48), etc.

Moreover, for the embodiment shown, the LP electric machine 102A is not the only electric machine 102 of the electric power system 100 integrated with the engine 10. More specifically, the electric power system 100 further includes an HP electric machine 102B coupled to the high-pressure system/core of the engine 10, and in electrical communication with the electric power bus 108. The HP electric machine 102B is, for the embodiment shown, also embedded within the engine 10 at a location inward of the core airflow path 54. However, for the embodiment shown, the HP electric machine 102B is located within the compressor section of the engine 10. It will be appreciated that in other embodiments, the HP electric machine 102B may alternatively be positioned outward of the core airflow path 54 along the radial direction R, driven through, e.g., a geared connection. For example, in certain embodiments, the HP electric machine 102B may be coupled to an accessory gearbox (not shown), which is in turn coupled to the high-pressure system of the engine 10.

In at least certain exemplary embodiments, the energy storage unit 104 may include one or more batteries. Additionally, or alternatively, the energy storage unit 104 may include one or more supercapacitor arrays, one or more ultracapacitor arrays, or both. In at least certain embodiments, the energy storage unit 104 may be configured to provide at least 5 kilowatts (kW) of energy to the electric power system 100, such as at least 50 kW, such as at least 50 kW, such as at least 250 kW, such as at least 300 kW, such as at least 350 kW, such as at least 400 kW, such as at least 500 kW, such as up to 5 megawatts (MW), such as up to 10 megawatts (MW). Further, the energy storage unit 104 may be configured to provide such electrical power for at least two minutes, such as at least three minutes, such as at least five minutes, such as up to an hour.

Referring still to FIG. 1, the exemplary electric power system 100 is operably connected to a controller 116. The controller 116 may be an engine controller for the engine 10 (e.g., a Full Authority Digital Engine Control controller), may be an aircraft controller, may be a controller dedicated to the electric power system 100, etc.

The controller 116 may be configured to receive data indicative of various operating conditions and parameters of the engine 10 during operation of the engine 10. For example, the engine 10 includes one or more sensors 114 configured to sense data indicative of various operating conditions and parameters of the engine 10, such as rotational speeds, temperatures, pressures, vibrations, etc. More specifically, however, for the exemplary embodiment depicted in FIG. 1, the one or more sensors 114 includes a first speed sensor 114A configured to sense data indicative of one or more parameters of the rotor assembly 12 (e.g., rotational speed, acceleration, torque on the rotor shaft driving the rotor assembly 12, etc.); a second sensor 114B configured to sense data indicative of the high pressure system (such as a rotational speed of high pressure spool 38, a compressor exit temperature, etc.); a third sensor 114C configured to sense data indicative of one or combustion section parameters (such as a temperature within the combustion section 40, a fuel flow to the combustion section 40, one or more pressures within or around the combustion section 40, etc.), one or more high pressure turbine parameters (such as turbine inlet temperature, a rotational speed of the high pressure turbine 36, etc.), or both; a fourth sensor 114D operable to sense data indicative of one or more parameters of the low pressure system (such as a rotational speed of the low pressure spool 55); and a fifth sensor 114E configured to sense data indicative of one or more variable geometry components (such as a position of one or more variable inlet guide vanes, outlet guide vanes, rotor blades 16, guide vanes 20, etc.).

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating an electric power system 100 (e.g., method 300), as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A. The memory device(s) 118B can further store data 118D that can be accessed by the processor(s) 118A. For example, the data 118D can include data indicative of power flows, data indicative of engine 10/aircraft operating conditions, and/or any other data and/ or information described herein.

The computing device(s) 118 can also include a network interface 118E used to communicate, for example, with the other components of the engine 10, the aircraft incorporating the engine 10, the electric power system 100, etc. For example, in the embodiment depicted, as noted above, the engine 10 includes one or more sensors 114 for sensing data indicative of one or more parameters of the engine 10 and various accessory systems, and the electric power system 100 includes an energy storage unit 104, an LP electric machine 102A, an HP electric machine 102B, and an auxiliary power unit. The controller 116 is operably coupled to these components through, e.g., the network interface 118E, such that the controller 116 may receive data indicative of various operating parameters sensed by the one or more sensors 114 during operation, various operating conditions of the components, etc., and further may provide commands to control electrical flow of the electric power system 100 and other operating parameters of these systems, e.g., in response to the data sensed by the one or more sensors 114 and other conditions.

The network interface 118E can include any suitable components for interfacing with one or more network(s), including for example, transmitters, receivers, ports, controllers, antennas, and/or other suitable components. For example, in the embodiment shown, the network interface 118E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that in other exemplary embodiments of the present disclosure, a hybrid electric propulsion may be provided including multiple engines similar to the gas turbine engines described above with reference to FIG. 1, FIG. 2, or both. The multiple engines may include electric machines that are in electrical communication with a common electric communication bus.

Figure 3:
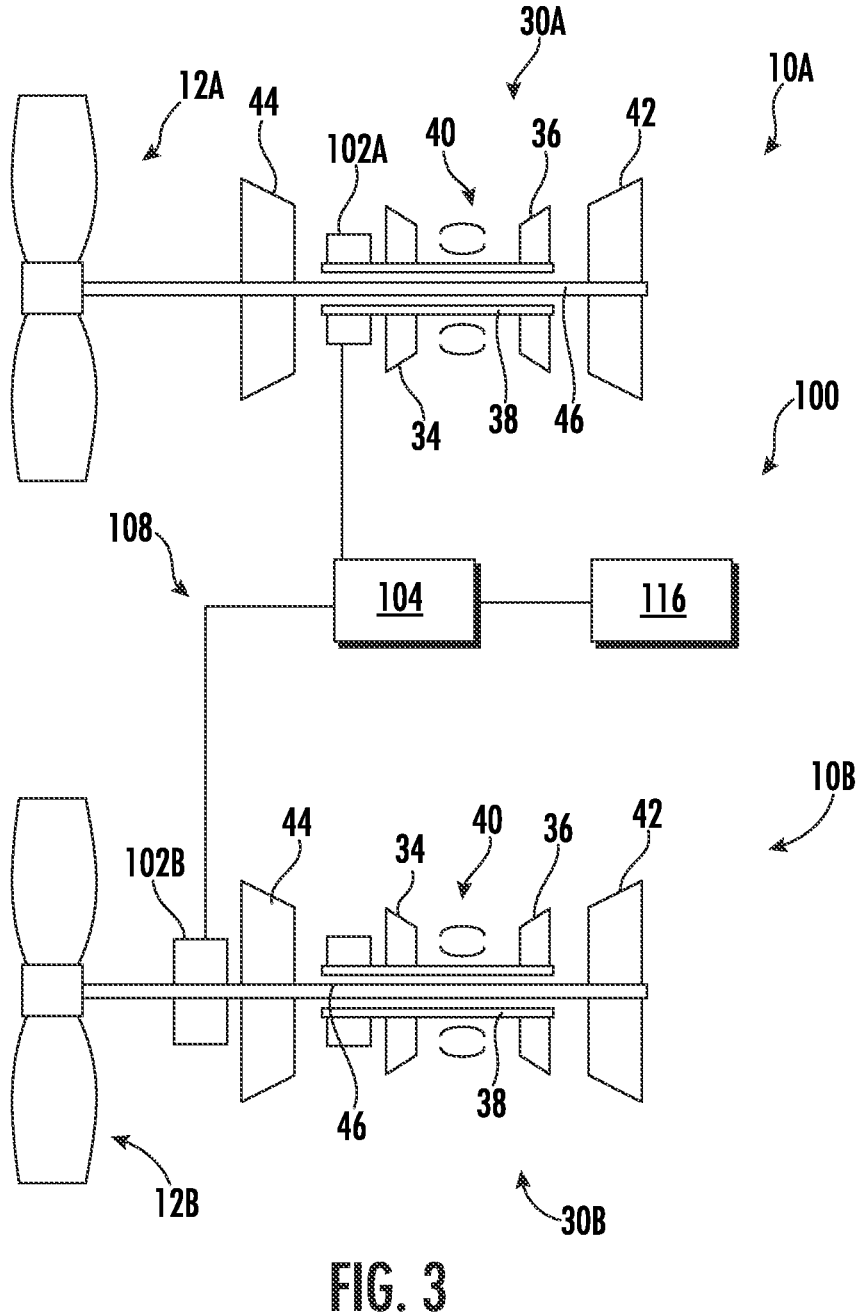
FIG. 3 is a schematic view of a propulsion system in accordance with another exemplary embodiment of the present disclosure.

For example, the exemplary hybrid-electric propulsion system of FIG. 3 generally includes a first engine 10A and a second engine 10B. The first engine 10A generally includes a first turbomachine 30A and a first rotor assembly 12A, and similarly, the second engine 10B generally includes a second turbomachine 30B and a second rotor assembly 12B. Each of the first and second turbomachines 30A, 30B generally includes a low pressure system having a low pressure compressor 44 drivingly coupled to a low pressure turbine 42 through a low pressure shaft 46, as well as a high pressure system having a high pressure compressor 34 drivingly coupled to a high pressure turbine 36 through a high pressure shaft 38. Additionally, the first rotor assembly 12A is drivingly coupled to the low pressure system of the first turbomachine 30A and the second rotor assembly 12B is drivingly coupled to the low pressure system of the second turbomachine 30B. In certain exemplary embodiments, the first rotor assembly 12A and first turbomachine 30A may be configured as a first turbofan engine and similarly, the second rotor assembly 12B and second turbomachine 30B may be configured as a second turbofan engine. Alternatively, however, these components may instead be configured as parts of a turboprop engine or any other suitable turbomachine-driven propulsion device. Further, in certain exemplary embodiments, the first engine 10A may be mounted to a first wing of an aircraft and the second engine 10B may be mounted to a second wing of the aircraft. However, in other exemplary embodiments, any other suitable configuration may be provided (e.g., both may be mounted to the same wing, one or both may be mounted to a tail of the aircraft, etc.).

Moreover, the hybrid electric propulsion system of FIG. 3 additionally includes an electrical system 100. The electrical system 100 includes a first electric machine 102A, a second electric machine 102B, and an electric energy storage unit 104 electrically connectable to the first electric machine 102A and second electric machine 102B.

The first electric machine 102A is additionally coupled to the first turbomachine 30A. More specifically, for the embodiment depicted, the first electric machine 102A is coupled to the high pressure system of the first turbomachine 30A, and more specifically still, is coupled to the high-pressure spool 38 of the first turbomachine 30A. In such a manner, the first electric machine 102A may extract power from the high pressure system of the first turbomachine 30A and/or provide power to the high-pressure system of the first turbomachine 30A.

Further, for the embodiment shown in FIG. 3, the second electric machine 102B is coupled to the second rotor assembly 12B of the second engine 10B, and is further coupled to the low pressure system of the second turbomachine 30B. In such a manner, the second electric machine 102B may extract power from the low pressure system of the second turbomachine 30B and/or provide power to the low pressure system of the first turbomachine 30A. More particularly, in certain exemplary aspects, the second electric machine 102 may drive, or assist with driving the second rotor assembly 12B.

As is also depicted in FIG. 3, the exemplary hybrid electric propulsion system further includes a controller 116 and a power bus 108. The first electric machine 102A, the second electric machine 102B, and the electric energy storage unit 104 are each electrically connectable to one another through the power bus 108. For example, the power bus 108 may include various switches or other power electronics movable to selectively electrically connect the various components of the hybrid electric propulsion system, and optionally to convert or condition such electrical power transferred therethrough.

Furthermore, it should be appreciated that in still other exemplary embodiments, the exemplary hybrid electric propulsion system may have other suitable configurations. For example, although the exemplary embodiment of FIG. 3 includes a first electric machine 102A coupled to the high-pressure system of the first turbomachine 30A and the second electric machine 102B coupled to the low pressure system of the second turbomachine 30B, in other exemplary embodiments, each of the electric machines 102A, 102B may be coupled to the low pressure system, or alternatively may be coupled to the high-pressure system. Further, for the embodiment of FIG. 3, the first electric machine 102A and second electric machine 102B are each depicted schematically as being embedded within the respective engine (e.g., located inward of a core air flowpath through the engine along a radial direction of the respective engine). However, in other embodiments, the Alternatively, in other exemplary embodiments the first electric machine 102A and/or second electric machine 102B may instead be located outward of the core air flowpath along the radial direction (e.g., within an under-cowl area of the engine).

Further, although for the embodiment shown schematically in FIG. 3 each engine only includes a single electric machine coupled to one of the low pressure system or high pressure system, in other exemplary embodiments the electrical system may further include electric machines coupled to both the low pressure system and high pressure system (i.e., for the embodiment of FIG. 3, an additional electric machine coupled to the low pressure system of the first turbomachine 30A and an additional electric machine coupled to the high-pressure system of the second turbomachine 30B).

Referring to FIG. 4, a flow diagram of a method 200 of the present disclosure is depicted. The method 200 of this disclosure generally includes at (202) receiving data indicative of an actual or anticipated in-flight shutdown of a gas turbine engine, and in response to receiving data indicative of the actual or anticipated in-flight shutdown of the gas turbine engine at (202), at (204) adding power to the gas turbine engine.

In certain exemplary aspects, adding power to the gas turbine engine at (204) may include automatically adding power to the gas turbine engine (e.g., through use of a controller), or alternatively may include manually initiating adding power to the gas turbine engine (through an operator initiated action).

More specifically, for the exemplary aspect of FIG. 4, receiving data indicative of an actual or anticipated in-flight shutdown of a gas turbine engine at (202) includes at (206) receiving data indicative of an actual in-flight shutdown condition. The data received at (206) may include rotational speed information, fuel flow information, temperature information, etc.

Alternatively, or additionally, as is indicated in phantom, the method 200 may include at (208) receiving data indicative of an anticipated in-flight shutdown and at (210) predicting an in-flight shutdown based on the data received at (208). With such a configuration, adding power to the engine at (204) may include adding power to the engine in response to the predicted in-flight shutdown. In certain exemplary aspects, the data received may be data indicative of a fuel interruption, a sudden change in a temperature parameter (e.g., exhaust gas temperature, which may indicate a partial flame out), etc. By anticipating the in- flight shutdown, and even quicker response may be provided, further minimizing any speed decay that may result.

Referring still to FIG. 4, adding power to the gas turbine engine at (204) may include adding power to a low pressure system of the gas turbine engine using an LP electric machine, adding power to a high pressure system of the gas turbine engine using an HP electric machine, or both. For example, adding power to the gas turbine engine may include providing electrical power to an electric machine from a separate aircraft engine (e.g., through a load sharing configuration similar to the embodiment of FIG. 3), from one or more electric energy storage units, from an auxiliary power unit, etc.

Adding power to the gas turbine engine at (204) includes at (212) adding at least 10 horsepower (hp). More specifically, in certain exemplary aspects, adding power to the gas turbine engine at (204) may include adding at least 20 hp, adding at least 30 hp, adding at least 40 hp, adding at least 50 hp, adding at least 60 hp, and/or adding up to 1000 hp.

Notably, however, in other aspects, even more power may be added. For example, in other exemplary aspects, adding power to the gas turbine engine at (204) may include adding at least 100 hp, such as at least 150 hp, such as at least 200 hp. In such a configuration, adding power to the gas turbine engine at (204) may include at (214) maintaining a rotational speed of a rotor assembly within about 40% of a pre-shutdown speed (e.g., a speed of the rotor assembly prior to the in-flight shutdown, such as a cruise rotational speed), such as within about 30% of the pre-shutdown speed, such as within about 20% of the pre-shutdown speed, such as within about 10% of the pre-shutdown speed. In such a case, the rotor assembly of the engine may be maintained at an idle rotational speed or higher through the in-flight shutdown.

Adding power to the gas turbine engine at (204) further includes for the exemplary aspect depicted at (216) adding power to the gas turbine engine immediately after (e.g., within 5 seconds, such as within 3 second, such as within 1 second) receiving data indicative of the actual or anticipated in-flight shutdown of the gas turbine engine at (202), and adding power to the gas turbine engine substantially continuously until the re-start process is initiated, adding power to the gas turbine engine substantially continuously until the engine is re-ignited, or both.

The method 200 may further include at (218) initiating a re-start of the engine after an amount of time after receiving data indicative of an actual or anticipated in-flight shutdown of a gas turbine engine at (202). The amount of time may be at least 10 seconds, at least 15 seconds, at least 20 seconds, or at least 25 seconds, and up to five minutes. Adding power to the gas turbine engine at (204) includes at (220) adding power during at least 75% of the amount of time after between receiving data indicative of the actual or anticipated in-flight shutdown of a gas turbine engine at (202) and initiating a re-start of the engine at (218). For example, adding power to the gas turbine engine at (204) includes adding power during at least 85% of the amount of time after between receiving data indicative of the actual or anticipated in-flight shutdown of a gas turbine engine at (202) and initiating a re-start of the engine at (218), such as at least 90% of the time, such as at least 95% of the time.

Notably, in other exemplary aspects, the method 200 may instead rotate the engine for longer durations prior to re-starting the engine at (218), such that the amount of time may be at least 20 minutes, such as at least 45 minutes, such as at least an hour. In such a case, the goal may be to ensure the engine continues rotating to prevent a rotor core lock condition when, e.g., it is decided to leave the engine in an off condition for an extended period of time (e.g., while gliding/flying with less than all engines operating) until it is time to perform higher thrust maneuvers. In this configuration, the electric power may come from an electric energy storage unit, or a separate motor (e.g., when part of a hybrid electric propulsion system configured to share power, see, e.g., FIG. 3), or the electric power may be generated by windmilling the LP system.

Initiating the re-start of the engine at (218) may include adding power to the engine using a starter system, such as a pneumatic starter system or an electrical starter system (e.g., including an electric motor/generator separate from LP and/or HP electric machine) receiving power from one or more energy storage devices, an auxiliary power unit, etc. Accordingly, it will be appreciated that adding power to the engine using a starter system may include: adding power to the engine using a starter system separate from the electric machine, and adding power to the engine using a starter system in addition to adding power to the gas turbine engine at (204). However, in other exemplary aspects, power may not be added from the starter system. For example, the starter system may require an external air source or dedicated battery, which may not be available during the re-start of the engine.

Adding power to the gas turbine engine at (204) in accordance with one or more of these exemplary aspects of the present disclosure may reduce the rate of deceleration of various aspects of the engine following an in-flight shutdown, improving the ability to subsequently restart then engine by increasing a rotational speed of certain aspects of the engine at the time of re-ignition.

Certain of these benefits are depicted in the graphs of FIGS. 5 through 10. Each of these graphs depict an engine parameter over time following an in-flight shutdown, comparing the baseline response in the line at 202, the modified response when adding power to the high pressure system (e.g., a high pressure (HP) shaft) in the line at 204, the modified response when adding power to the low pressure system (e.g., the low pressure (LP) shaft) in the line at 206, and the modified response when adding power to both the high and low pressure systems (HP shaft and LP shaft) in the line at 208.

Figure 5:
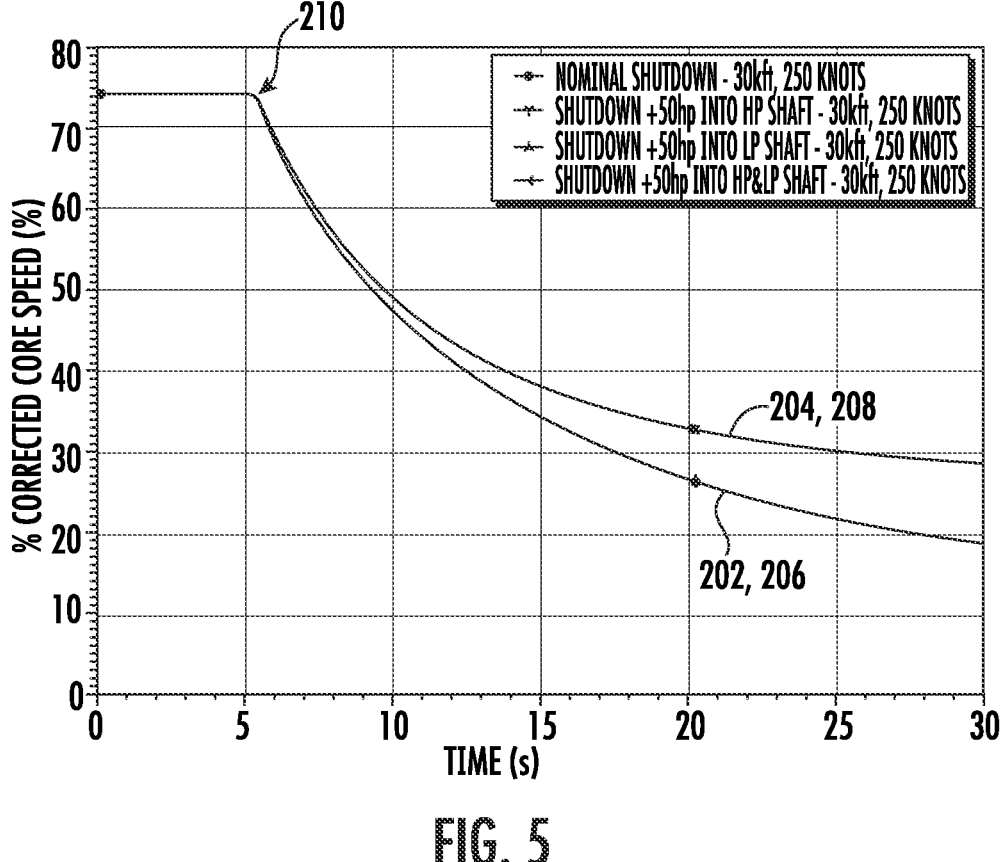
FIG. 5 is a graph depicting engine conditions following a shutdown of an engine according to exemplary aspects of the present disclosure.

Referring particularly to FIG. 5, the corrected core speed of the engine (i.e., the corrected rotational speed of the high-pressure system of the engine) is depicted over time. As is shown, following an in-flight shutdown at 210, the high-pressure system of the engine having power added to the high-pressure system rotates at a higher corrected rotational speed as compared to the engines having no power added to the high-pressure system. In the embodiment depicted, it will be appreciated that by adding power to the high-pressure system, the high-pressure system of the engine may rotate at least 10% faster (such as at least 25% faster, such as at least 35% faster, such as at least 45% faster, such as up to 100% faster), as compared to an engine without power being added to the high-pressure system, after at least 20 seconds following the in-flight shutdown and less than about 1 minute following the in-flight shutdown.

Figure 6:
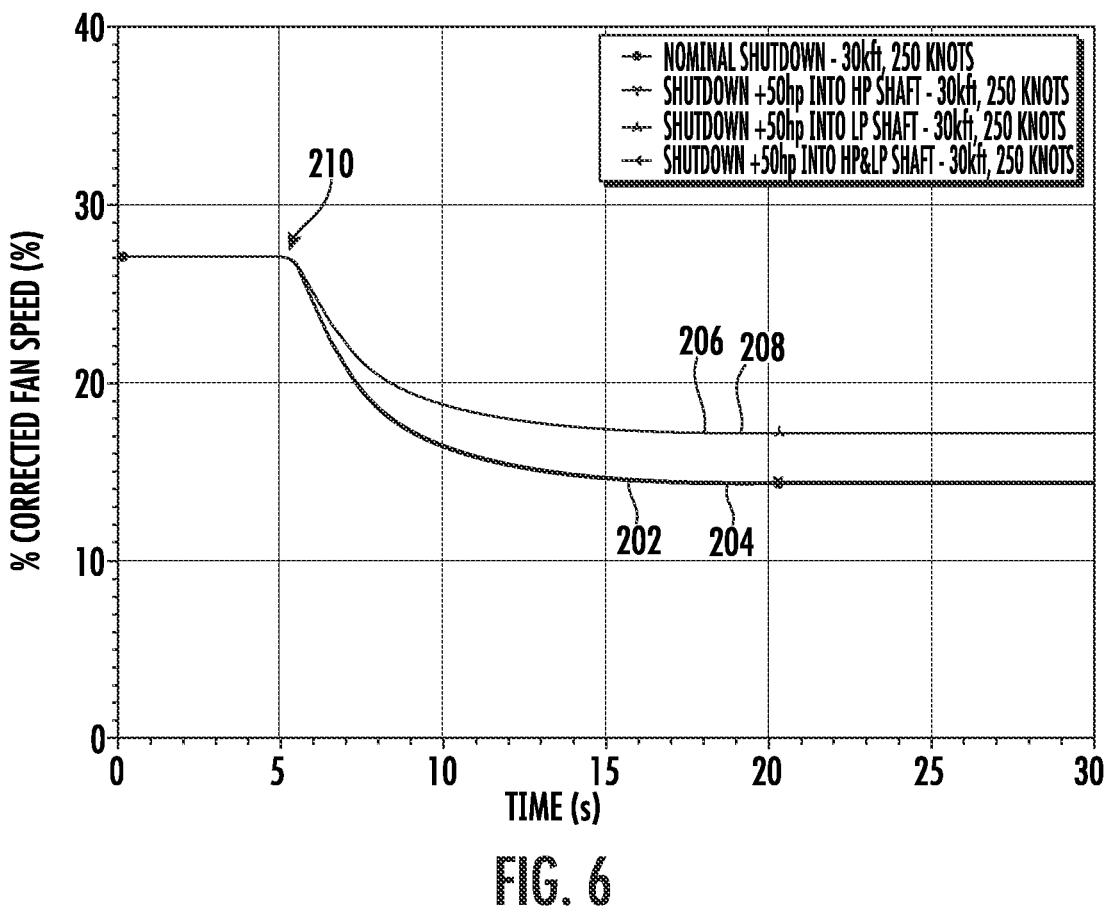
FIG. 6 is a graph depicting additional engine conditions following a shutdown of an engine according to exemplary aspects of the present disclosure.

Further, referring now to FIG. 6, the corrected fan speed of the engine (i.e., the corrected rotational speed of a propeller/fan) is depicted over time. As shown, following the in-flight shutdown at 210, the fan of an engine having power added to the low pressure system rotates at a higher corrected rotational speed as compared to the fan of an engine having no power added to the low pressure system. In the embodiment depicted, it will be appreciated that by adding power to the low pressure system, the fan of the engine may rotate at least 5% faster (such as at least 10% faster, and up to hundred percent faster), as compared to the fan of an engine without power being added to the low pressure system, after at least 20 seconds following the in-flight shutdown and less than about 1 minute following the in-flight shutdown.

Figure 7:
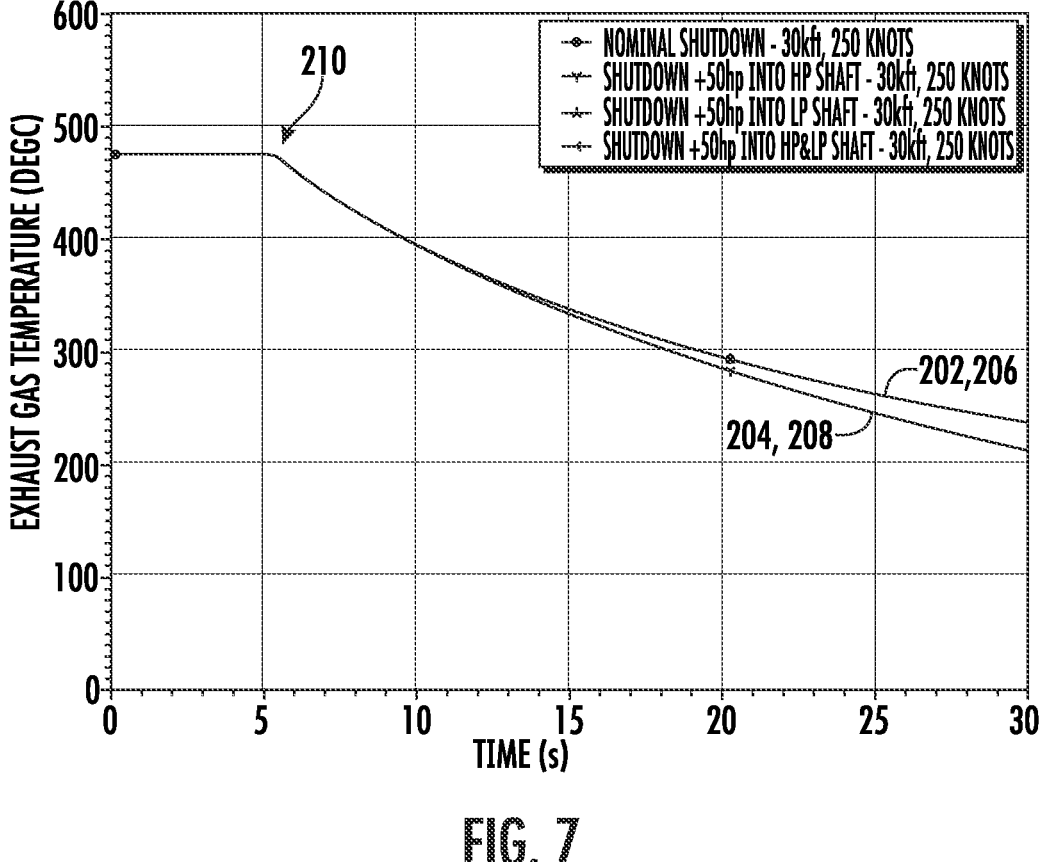
FIG. 7 is a graph depicting additional engine conditions following a shutdown of an engine according to exemplary aspects of the present disclosure.

Further, still, referring now to FIG. 7, the exhaust gas temperature and engine is depicted over time. As shown, following the in-flight shutdown at 210, the exhaust gas temperature of an engine having power added to the high-pressure system of the engine is lower than the exhaust gas temperature of an engine without having power added to the high-pressure system of the engine. In the embodiment depicted, it will be appreciated that by adding power to the high-pressure system of the engine, the exhaust gas temperature may be at least 10° Celsius (C) less, such as at least 20° C. less and up to 100° C. less, as compared to an engine without power being added to the high-pressure system, after at least 20 seconds following the in-flight shutdown and less than about 1 minute following the in-flight shutdown. Such a reduction in exhaust gas temperature may increase an ability to relight the engine without stalling the engine, and without over exposing certain components to temperatures in excess of desired temperature limits.

Figure 8:
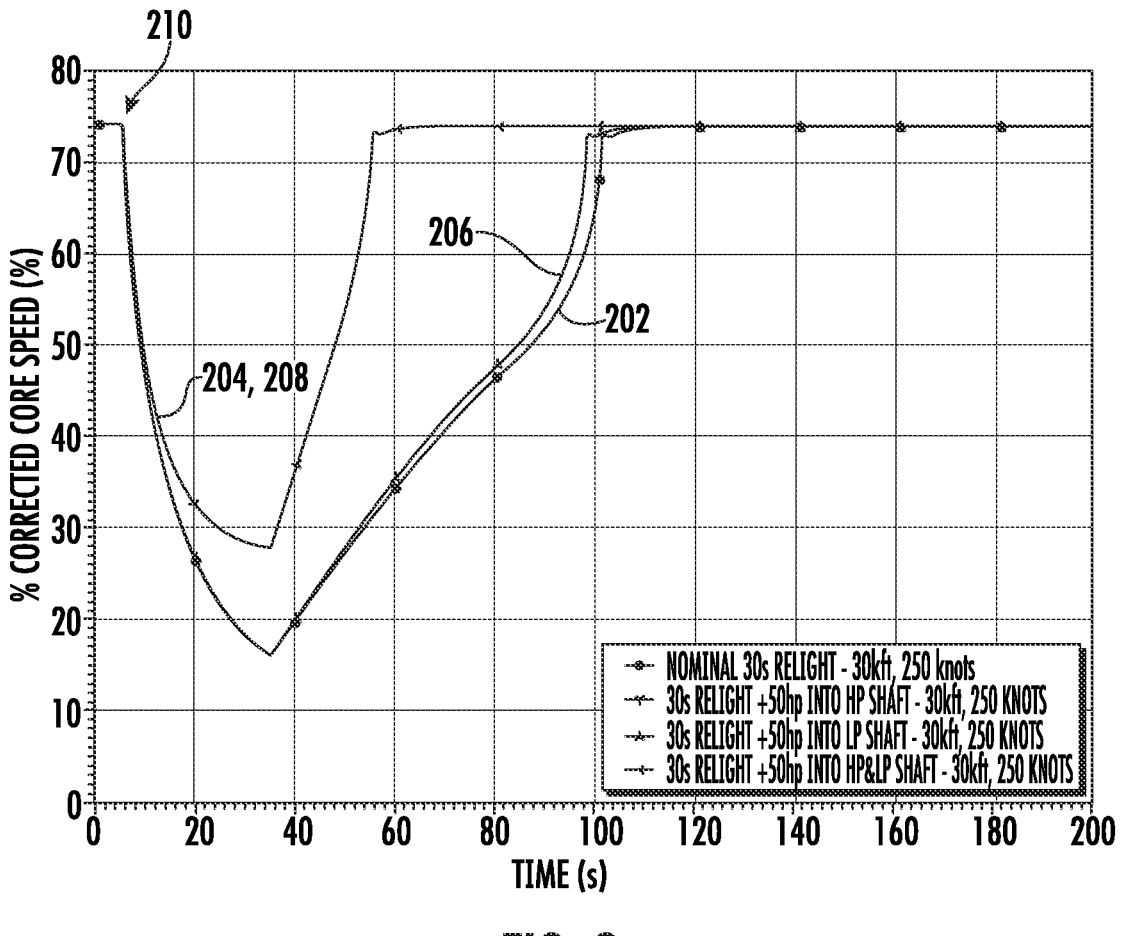
FIG. 8 is a graph depicting engine conditions between a shutdown and restart of an engine according to exemplary aspects of the present disclosure.
Figure 9:
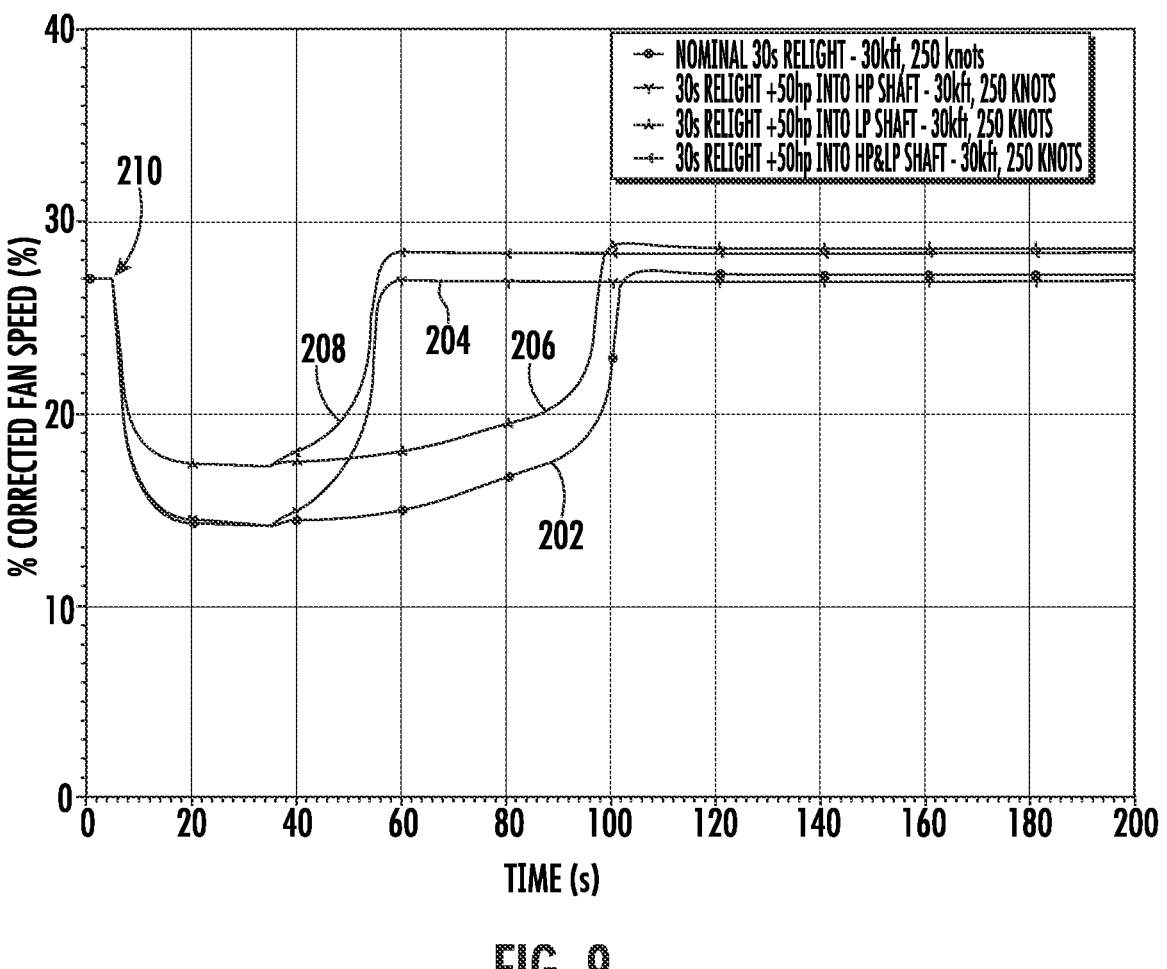
FIG. 9 is a graph depicting additional engine conditions between a shutdown and restart of an engine according to exemplary aspects of the present disclosure.

Referring now to FIGS. 8 and 9, the corrected core speed and corrected fan speed are depicted during an attempted relighting of an engine following an in-flight shutdown of the engine at 210. As is shown, adding power to at least one of the low pressure system and high-pressure system of the engine may decrease an amount of time required for the engine to get back to pre-shutdown rotational speeds following the in-flight shutdown. For example, when power is added to the high-pressure system, the amount of time required for the engine to get back to pre-shutdown rotational speeds following the in-flight shutdown may be reduced by at least 20 seconds, such as by at least 30 seconds, such as by at least about 40 seconds. Reducing the time required for the engine to get back to pre-shutdown rotational speeds may have a variety of benefits, including reduced altitude loss during the restart, as well as a reduced risk of overheating the turbines or stalling the compressors. As will be appreciated, adding power to the engine in accordance with the present disclosure is not meant to reduce an amount of time before a re-ignition may be achieved (as this time period is typically fixed), but instead is meant to reduce the rate of deceleration of the components of the engine following an in-flight shutdown to make it easier to reignite the engine once the time period has lapsed.

Figure 10:
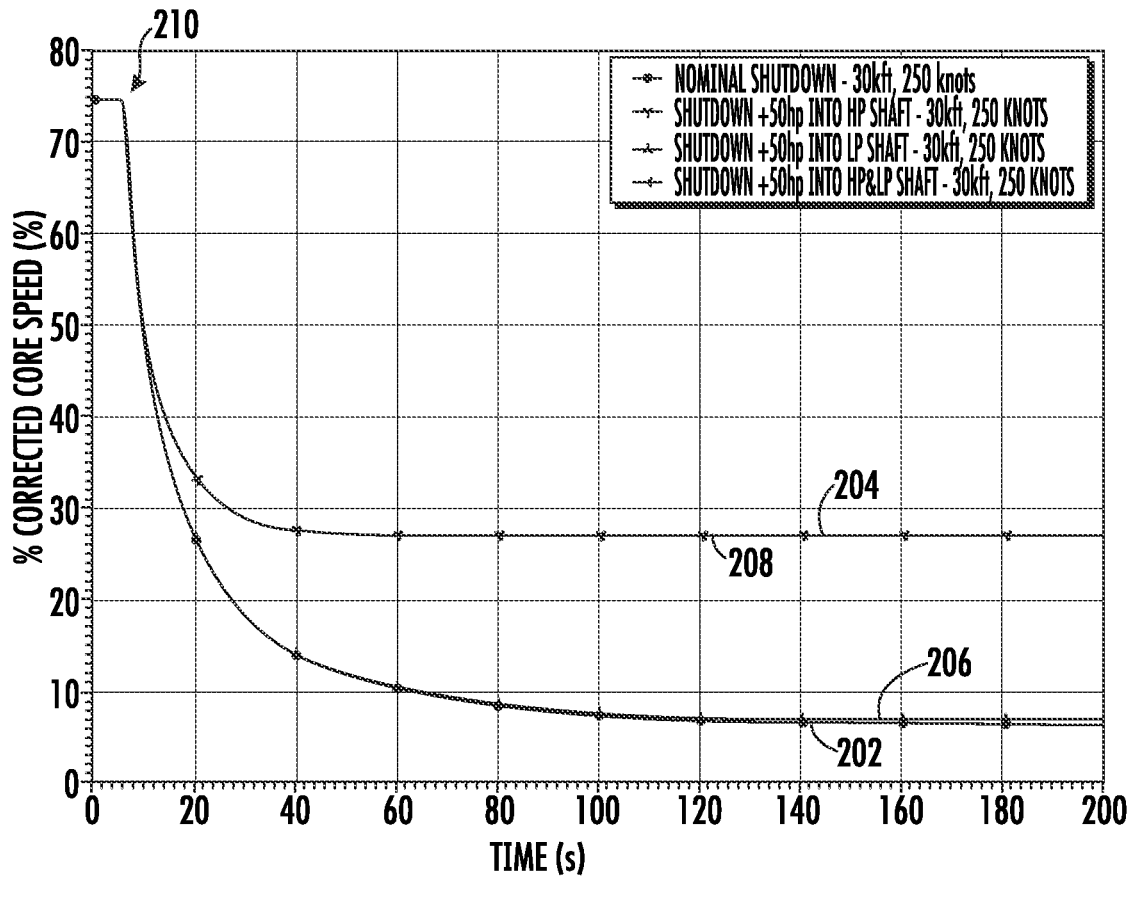
FIG. 10 is a graph depicting engine conditions following a shutdown of an engine according to exemplary aspects of the present disclosure.

Referring now to FIG. 10, the corrected core speed of an engine is depicted following in-flight shutdown at 210 over time to show the effect on windmilling speeds. As shown, adding power to the high-pressure system increases the corrected core speed at an equilibrium state of the engine (e.g., after about two minutes). In particular, for the embodiment shown, the corrected core speed at the equilibrium state is at least about 10% greater, such as at least about 20% greater, as compared to the core speed of an engine at the equilibrium state without power added to the high-pressure system. In such a manner, it will be appreciated that adding power to the high-pressure system may improve a windmill start time of the engine, may reduce risk of overheating turbines and/or stalling compressors, may reduce the risk of rotor lock, and further may allow for expansion of the windmill start to higher altitudes and/or lower airspeeds.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for operating a hybrid-electric propulsion system of an aircraft, the hybrid-electric propulsion system comprising a gas turbine engine having a high pressure system, a low pressure system, and an electric machine coupled to one of the high pressure system or low pressure system, the method comprising: receiving data indicative of an actual or anticipated in-flight shutdown of the gas turbine engine; and adding power to the gas turbine engine through the electric machine in response to receiving data indicative of the actual or anticipated in-flight shutdown of the gas turbine engine.

The method of one or more of these clauses, wherein receiving data indicative of the actual or anticipated in-flight shutdown of the gas turbine engine comprises receiving data indicative of an actual in-flight shutdown of the gas turbine engine.

The method of one or more of these clauses, wherein adding power to the gas turbine engine includes adding power to the gas turbine engine immediately after receiving data indicative of the actual in-flight shutdown of the gas turbine engine.

The method of one or more of these clauses, further including initiating a re-start of the engine after an amount of time after receiving data indicative of the actual in-flight shutdown of a gas turbine engine.

The method of one or more of these clauses, wherein adding power to the gas turbine engine includes adding power to the gas turbine engine substantially continuously at least until the re-start process is initiated, adding power to the gas turbine engine substantially continuously until the engine is re-ignited, or both.

The method of one or more of these clauses, wherein the amount of time is at least 10 seconds.

The method of one or more of these clauses, wherein initiating the re-start of the engine includes adding power to the engine using a starter system.

The method of one or more of these clauses, wherein receiving data indicative of the actual or anticipated in-flight shutdown of the gas turbine engine comprises determining an anticipated in-flight shutdown pf the gas turbine engine.

The method of one or more of these clauses, wherein adding power to the gas turbine engine includes adding power to the low pressure system of the gas turbine engine using the electric machine, adding power to the high pressure system of the gas turbine engine using the electric machine, or both.

The method of one or more of these clauses, wherein adding power to the gas turbine engine includes adding power to the low pressure system of the gas turbine engine using the electric machine.

The method of one or more of these clauses, wherein adding power to the gas turbine engine includes adding power to the low pressure system of the gas turbine engine using the electric machine while the low pressure system is operating at a rotational speed equal to at least 40% of a maximum rotational speed for the low pressure system.

The method of one or more of these clauses, wherein adding power to the gas turbine engine includes adding power to the low pressure system of the gas turbine engine using the electric machine while the low pressure system is operating at a rotational speed equal to at least 60% of a maximum rotational speed for the low pressure system.

The method of one or more of these clauses, wherein the electric machine is a first electric machine, wherein adding power to the gas turbine engine includes adding power to the low pressure system of the gas turbine engine using the first electric machine and adding power to the high pressure system of the gas turbine engine using a second electric machine.

The method of one or more of these clauses, wherein adding power to the gas turbine engine includes providing electrical power to the electric machine from an external source.

The method of one or more of these clauses, wherein the electric machine is a first electric machine, wherein the gas turbine engine is a first gas turbine engine, wherein adding power to the gas turbine engine includes providing electrical power to the electric machine from a second electric machine driven by a second gas turbine engine.

The method of one or more of these clauses, wherein adding power to the gas turbine engine includes providing electrical power to the electric machine from one or more electric energy storage units, from an auxiliary power unit, or both.

The method of one or more of these clauses, wherein adding power to the gas turbine engine includes adding at least 10 horsepower.

The method of one or more of these clauses, wherein adding power to the gas turbine engine includes adding at least 50 horsepower.

The method of one or more of these clauses, wherein adding power to the gas turbine engine includes adding power to the low pressure system of the gas turbine engine using the electric machine to maintain a rotation speed of the low pressure system within about 75% of a pre-shutdown speed.

The method of one or more of these clauses, wherein adding power to the gas turbine engine includes adding power to the low pressure system of the gas turbine engine using the electric machine to maintain a rotation speed of the low pressure system within about 70% of a pre-shutdown speed.

The method of one or more of these clauses, wherein adding power to the gas turbine engine includes adding power to the low pressure system of the gas turbine engine using the electric machine to maintain a rotation speed of the low pressure system above 20% of a maximum corrected speed.

The method of one or more of these clauses, wherein adding power to the gas turbine engine includes adding power to the low pressure system of the gas turbine engine using the electric machine to maintain a rotation speed of the low pressure system above 25% of a maximum corrected speed.

A hybrid-electric system comprising: a gas turbine engine having a high pressure system, a low pressure system, an electric machine coupled to one of the high pressure system or low pressure system, and a controller, the controller including memory and one or more processors, the memory storing instructions that when executed by the one or more processors cause the system to perform one or more functions, the function including receiving data indicative of an actual or anticipated in-flight shutdown of the gas turbine engine; and adding power to the gas turbine engine through the electric machine in response to receiving data indicative of the actual or anticipated in-flight shutdown of the gas turbine engine The hybrid-electric system of one or more of these clauses, wherein receiving data indicative of the actual or anticipated in-flight shutdown of the gas turbine engine comprises receiving data indicative of an actual in-flight shutdown of the gas turbine engine.

The hybrid-electric system of one or more of these clauses, wherein receiving data indicative of the actual or anticipated in-flight shutdown of the gas turbine engine comprises receiving data indicative of an actual in-flight shutdown of the gas turbine engine.

The hybrid-electric system of one or more of these clauses, wherein adding power to the gas turbine engine includes adding power to the gas turbine engine immediately after receiving data indicative of the actual in-flight shutdown of the gas turbine engine.

The hybrid-electric system of one or more of these clauses operated in accordance with a method of one or more of these clauses.

The method of one or more of these clauses applied to a hybrid-electric system of one or more of these clauses.

The invention claimed is:

1. A method for operating a hybrid-electric propulsion system of an aircraft, the hybrid-electric propulsion system comprising a gas turbine engine having a starter system, a high pressure system, a low pressure system, a first electric machine coupled to the low pressure system, and a second electric machine coupled to the high pressure system, the first electric machine and the second electric machine separate from the starter system, the method comprising:

during a flight, receiving data indicative of an actual or anticipated in-flight shutdown of the gas turbine engine; and during the flight, adding power to the gas turbine engine within five seconds after receiving data of the actual in-flight shutdown through the first electric machine and the second electric machine in response to receiving data indicative of the actual or anticipated in-flight shutdown of the gas turbine engine;

wherein adding power to the gas turbine engine comprises adding power using the first electric machine and the second electric machine to maintain a rotation speed of the low pressure system and the high pressure system of at least 25% of a pre-shutdown rotation speed of the low pressure system and the high pressure system throughout the actual in-flight shutdown and a subsequent restart of the gas turbine engine, wherein adding power to the gas turbine engine comprises adding at least 10 horsepower and up to 1000 horsepower, wherein adding power to the gas turbine engine comprises adding power to the high pressure system to reduce an exhaust gas temperature of the gas turbine engine by at least 10° Celsius and up to 100° Celsius, and wherein adding power to the gas turbine engine includes adding power to the low pressure system of the gas turbine engine using the first electric machine embedded within the gas turbine engine at a location aft of a turbine section of the gas turbine engine and inward of a core airflow path through the gas turbine engine to reduce a rate of deceleration of components of the gas turbine engine following the actual in-flight shutdown, decrease a first amount of time required for the gas turbine engine to get back to the pre-shutdown rotational speed following the actual in-flight shutdown, and reduce altitude loss during the subsequent restart of the gas turbine engine; and adding power to the high pressure system of the gas turbine engine using the second electric machine in electrical communication with an electric power bus and inward of the core airflow path through the gas turbine engine to reduce the rate of deceleration of the components of the gas turbine engine following the actual in-flight shutdown, decrease the first amount of time required for the gas turbine engine to get back to the pre-shutdown rotational speed following the actual in-flight shutdown, and reduce altitude loss during the subsequent restart of the gas turbine engine.

2. The method of claim 1, wherein receiving data indicative of the actual or anticipated in-flight shutdown of the gas turbine engine comprises receiving data indicative of the actual in-flight shutdown of the gas turbine engine.

3. The method of claim 2, further including initiating a re-start of the engine after a second amount of time after receiving data indicative of the actual in-flight shutdown of a gas turbine engine, wherein adding power to the gas turbine engine includes adding power to the gas turbine engine substantially continuously until the re-start process is initiated and adding power to the gas turbine engine substantially continuously until the engine is re-ignited.

4. The method of claim 3, wherein the second amount of time is at least 10 seconds.

5. The method of claim 1, wherein receiving data indicative of the actual or anticipated in-flight shutdown of the gas turbine engine comprises determining an anticipated in-flight shutdown of the gas turbine engine.

6. The method of claim 1, wherein adding power to the gas turbine engine includes adding power to the low pressure system of the gas turbine engine using the first electric machine to maintain a rotation speed of the low pressure system within 75% of the pre-shutdown rotational speed.

7. The method of claim 1, wherein adding power to the gas turbine engine includes adding power to the low pressure system of the gas turbine engine using the first electric machine to maintain the rotation speed of the low pressure system above 25% of a maximum corrected speed of the low pressure system.

8. The method of claim 1, wherein adding power to the gas turbine engine includes providing electrical power to the first electric machine and the second electric machine from an external source.

9. The method of claim 8, wherein adding power to the gas turbine engine includes providing electrical power to the first electric machine from electric energy storage units and an auxiliary power unit.

10. The method of claim 1, wherein adding power to the gas turbine engine includes adding at least 10 horsepower.

11. The method of claim 1, wherein adding power to the gas turbine engine includes adding at least 50 horsepower.

12. The method of claim 1, wherein adding power to the gas turbine engine comprises adding at least 100 horsepower and up to 1000 horsepower.

13. The method of claim 1, wherein adding power to the gas turbine engine comprises adding power to the high pressure system to reduce the exhaust gas temperature of the gas turbine engine by at most 100° Celsius.

14. A hybrid-electric system comprising:

a gas turbine engine having a starter system, a high pressure system, a low pressure system, an electric machine coupled to one of the high pressure system or low pressure system, the electric machine separate from the starter system, and a controller, the controller including memory and one or more processors, the memory storing instructions that when executed by the one or more processors cause the system to perform one or more functions, the functions including:

during a flight, receiving data indicative of an actual or anticipated in-flight shutdown of the gas turbine engine;

during the flight, adding power within five seconds after receiving data of the actual in-flight shutdown to the gas turbine engine through the electric machine in response to receiving data indicative of the actual or anticipated in-flight shutdown of the gas turbine engine; and maintaining, with the electric machine, a rotation speed of the low pressure system and the high pressure system of at least 25% of a pre-shutdown rotation speed of the low pressure system and the high pressure system throughout the actual in-flight shutdown and subsequent restart of the gas turbine engine, wherein adding power to the gas turbine engine comprises adding at least 10 horsepower and up to 1000 horsepower, wherein adding power to the gas turbine engine comprises adding power to the high pressure system to reduce an exhaust gas temperature of the gas turbine engine by at least 10° Celsius and up to 100° Celsius, and wherein the electric machine comprises a low pressure electric machine embedded within the gas turbine engine at a location aft of a turbine section of the gas turbine engine and inward of a core airflow path through the gas turbine engine and a high pressure electric machine in electrical communication with an electric power bus and inward of the core airflow path through the gas turbine engine, wherein adding power to the gas turbine engine includes adding power to the low pressure system of the gas turbine engine using the low pressure electric machine to reduce a rate of deceleration of components of the gas turbine engine following the actual in-flight shutdown, decrease a first amount of time required for the gas turbine engine to get back to the pre-shutdown rotational speed following the actual in-flight shutdown, and reduce altitude loss during the subsequent restart of the gas turbine engine; and adding power to the high pressure system of the gas turbine engine using the high pressure electric machine to reduce the rate of deceleration of the components of the gas turbine engine following the actual in-flight shutdown, decrease the first amount of time required for the gas turbine engine to get back to the pre-shutdown rotational speed following the actual in-flight shutdown, and reduce altitude loss during the subsequent restart of the gas turbine engine.

15. The hybrid-electric system of claim 14, wherein receiving data indicative of the actual or anticipated in-flight shutdown of the gas turbine engine comprises receiving data indicative of the actual in-flight shutdown of the gas turbine engine.

* * * * *